April 29, 1947.    L. A. DE ROSA    2,419,541
DISTANCE INDICATING DETECTION SYSTEM
Filed Feb. 20, 1943

INVENTOR.
LOUIS A. DeROSA
BY
*Percy P. Lantz*
ATTORNEY

Patented Apr. 29, 1947

2,419,541

UNITED STATES PATENT OFFICE 2,419,541

DISTANCE INDICATING DETECTION SYSTEM

Louis A. de Rosa, Staten Island, N. Y., assignor to Federal Telephone and Radio Corporation, Newark, N. J., a corporation of Delaware Application February 20, 1943, Serial No. 476,599

8 Claims. (Cl. 250—1.66)

This invention relates to radio detection systems.

An object of my invention is to provide a radio detection system capable of indicating, at points remote from a transmitter station, by a characteristic of the transmission, the distance to obstacles detected thereby.

Another object of the invention is to provide a combination radio detection and signalling system whereby the location of obstacles and the signalling of intelligence can be effected simultaneously by the same impulse transmission.

According to the principles of my invention, I use a radio detection system in the usual manner to detect obstacles. Impulses are transmitted at spaced intervals and echo pulses produced by obstacles in response to the transmitted impulses are received and the time interval between the transmission of an impulse and the reception of a particular echo pulse is observed. This time interval is measured by means of a reference pulse used in connection with the cathode ray oscillograph of the system. The energy of the reference pulses which is synchronized with the transmission of impulses is variably retarded so as to adjust the reference pulse along the sweep line of the oscillograph. By proper adjustment of the retardation of the reference pulse, the reference pulse may be caused to single out one of the echo pulses by bringing the reference pulse into coincidence or superposition with respect to the selected echo pulse. The adjustment of the retardation means gives an indication of the time interval or distance from the transmitter station to the obstacle represented by the selected echo pulse.

The indication of this distance or time interval to remote points from the transmitter station is effected by varying the repetition frequency of the impulse transmission according to the time interval observed. This may be done automatically, it being understood that a given ratio between the time intervals and the repetition frequency of impulse transmission will be predetermined. The repetition frequency of impulse transmission indicates the distance between the transmitter station and the selected obstacle.

This impulse transmission may be received at remote points by radio receiver tuned to the carrier frequency of the transmitter. The receiver may be provided with any desired frequency indicating means capable of producing constant area pulsations in response to the reception of impulses. For example, a self extinguishing gas discharge tube may be used. Another example is a multivibrator adapted to be triggered from one state of operation to a second state by each of the successive impulses, the multivibrator being arranged to return to the first state of operation a predetermined time interval after each triggered operation. By integrating the pulsations produced, the repetition frequency of the impulses and therefore the distance represented by the frequency may be observed.

This system is particularly useful for indicating the range and changes in the range of an enemy craft with respect to gun positions. For example, the ranged indications of the repetition frequency of transmitted impulses are useful as a range index for predictor systems. By using one transmitter, the system according to my invention can serve a plurality of neighboring gun positions. Many other uses may be made of this system such, for example, as by a friendly airplane or ship by noting the repetition frequency at which the friendly transmitter is sending impulses to tell the range of an enemy craft upon which the transmitter is focused.

For a further understanding of the invention reference may be had to the following detailed description to be read in connection with the accompanying drawings, in which.

Figure 1:
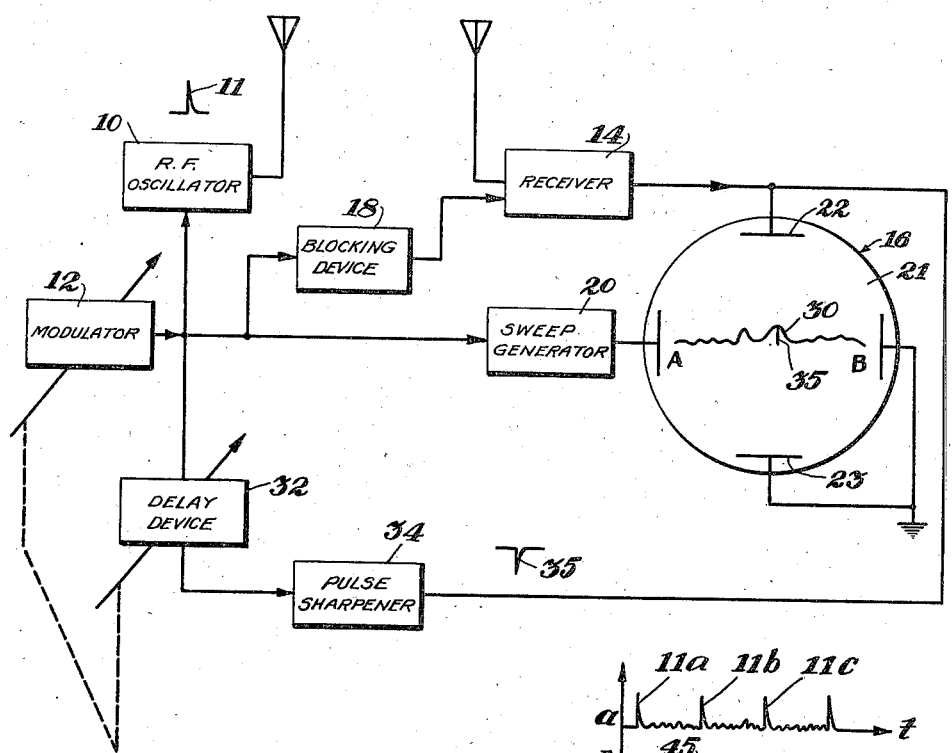
Fig. 1 is a block diagram of a radio detection system according to my invention.

Referring to Fig. 1, the system therein disclosed includes a radio frequency oscillator 10 and a modulator 12 adjustable to control the transmission of impulses 11 over a range of frequencies. The system also includes a receiver 14 and a cathode ray oscillograph 16 by which echo pulses produced by obstacles in response to the transmitted impulses are received and indicated in their time displacements with respect to the transmitted impulses. The receiver is momentarily blocked during the transmission of impulses in the usual manner by a blocking device 18. A sweep generator 20 is triggered by energy from the modulator 12 in synchronism with impulse transmission to provide a sweep line A—B on the screen 21 of the oscillograph. The received echo pulses are applied to the oscillograph across the deflection plates 22 and 23 to produce pulse formations in the sweep line according to the receiver reception.

In order to single out a particular echo pulse such as the pulse 30 and determine directly the time interval or distance represented by the location of the pulse along the sweep line A—B, I provide an adjustable delay device 32 of any type, for example one operating in a manner similar to that described in my copending application Serial No. 454,198, filed August 8, 1942. The delay device is connected to receive pulse energy from the output of modulator 12 in synchronism with the transmission of impulses. This pulse energy is retarded according to the setting of the delay device and applied to a pulse sharpener 34 to compensate for any shape alternations produced by the retardation. The resultant reference pulse 35 is applied across the deflection plates 22 and 23, and by proper adjustment of the delay device 32, may be caused to coincide with the peak of a selected pulse as indicated at the echo pulse 30. In this adjustment the delay device which is suitably calibrated will give the time interval represented by the position of the echo pulse 30 along the trace line A—B.

The adjustable part, such as a movable contact, of the delay device 32 is connected to the adjustable part such as a condenser or inductance coil, of the modulator 12. The connection between the adjustable parts of the modulator 12 and the delay device 32 is predetermined so as to provide a given ratio for example, a repetition frequency of 2,500 pulses per minute for a range of 50 miles. By increasing the pulsing frequency to 5,000 pulses per minute, the corresponding distance would be 25 miles and further increases in pulse repetition frequency will give a corresponding decrease in the distance indicated thereby.

Figure 2:
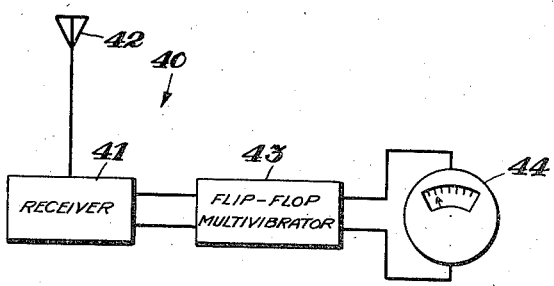
Fig. 2 is a block diagram of a receiver system for use in conjunction with the detection system of Fig. 1.

The gun emplacements or other points remote to the transmiter station are provided with suitable receiver equipment 40 (Fig. 2) to receive the impulses. The receiver equipment for example, may comprise a receiver 41, antenna 42, a flip-flop multivibrator 43 and a suitably graduated meter 44. The multivibrator is connected to the output of the receiver 41 and is arranged to respond only to the strong impulses from the transmitter station.

Figure 3:
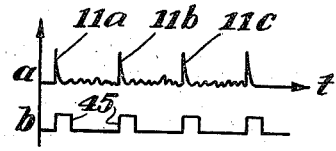
Fig. 3 is a graphical illustration of the operation of the system.

The transmitted impulses 11a, 11b, 11c, etc. (Fig. 3) each trigger the multivibrator from a normal state of operation to a second state of operation from which it flops back to the normal state of operation a short interval thereafter. The echo pulses which are of lesser amplitude may be disregarded since the circuit is preferably biased at a level above the amplitude of the echo pulses. The flip-flop operation of the multivibrator 43 produces pulsations 45. These pulsations which are of equal area are integrated by the meter 44 thereby producing an indication of frequency, time or distance whichever the calibration of the meter may be chosen to represent.

The range indications and the rate of change of the repetition frequency of the transmitted impulses can be utilized for predicting the path of the target much as aircraft and ships.

From the foregoing it will be clear that my system for detecting obstacles indicates by means of the transmitted impulses the distance from the transmitter to an obstacle upon which the transmitter is focused. While I have shown this principle of operation in connection with a specific transmitter and receiver apparatus, it will be understood that the disclosure is given by way of example only and not in limitation of the scope of the invention as set forth in the objects and the appended claims.

I claim:

1. A radio detection system comprising a radio frequency oscillator and a pulse modulator for transmission of impulses, a cathode ray oscillograph having a sweep circuit, means to synchronize said sweep with the transmission of impulses, a deflection circuit for said oscillograph, a receiver connected to said deflection circuit to produce on the screen of the oscillograph echo pulses of obstacles reflecting the transmitted impulses, a delay device adjustable to retard reference pulse energy synchronized with transmission of said impulses, means to apply the reference pulse to said deflection circuit for follow up movement with respect to a selected echo pulse, and means to vary the timing of said modulator according to the adjustment of said delay device, thereby varying the transmission of impulses at a repetition frequency indicative of the distance to the particular obstacle represented by the echo pulse singled out by said reference pulse.

2. A method of indicating to remote points the distance to obstacles from a transmitter station by the repetition frequency of the impulses transmitted for obstacle detection, comprising indicating the timing of echo pulses received in response to transmitted impulses from different obstacles within a given range, singling out a particular obstacle by the echo pulse indication corresponding to such obstacle, measuring the time interval between transmission of an impulse and the reception of the corresponding echo pulse caused by said particular obstacle to thereby determine the distance to the obstacle, and adjusting the repetition frequency of subsequent impulse transmission proportional to said time interval determined for said particular obstacle.

3. A method of indicating to remote points the distance to obstacles from a transmitter station by the repetition frequency of the impulses transmitted for obstacle detection, comprising indicating the echo pulses received in response to transmitted impulses from different obstacles within a given range, singling out a particular obstacle by the echo pulses produced thereby, the singling out operation including delaying impulses synchronized with said transmitted impulses until the delayed impulse indication thereof coincides with the echo pulse indication corresponding to said particular obstacle, the amount of delay determining the distance to the obstacle, and adjusting the repetition frequency of impulse transmission proportional to the delay determined for said particular obstacle.

4. A method of indicating to remote points the distance to obstacles from a transmitter station by the repetition frequency of the impulses transmitted for obstacle detection, comprising indicating the timing of echo pulses received in response to transmitted impulses from different obstacles within a given range, singling out a particular obstacle by the echo pulse indication thereof corresponding to such obstacle, measuring the time interval between transmission of an impulse and the reception of the corresponding selected echo pulse caused by said particular obstacle to thereby determine the distance to the obstacle, adjusting the repetition frequency of subsequent impulse transmission proportional to said time interval determined for said particular obstacle, and at a remote point, receiving the adjusted transmitted impulses, and determining from the frequency of said adjusted transmitted impulses the distance of said obstacle from the transmitter station.

5. A radio detection system for indicating to remote points the distance of obstacles from a transmitter station by the repetition frequency of impulses transmitted, comprising means to transmit impulses, means to detect echo pulses produced by obstacles in response to the impulses, means to produce indications of the echo pulses according to the time of reception, adjustable means to delay impulses synchronized with the transmitted impulses and to produce an indication in coincidence with a selected one of said indicated echo pulses corresponding to a particular obstacle thereby determining the time interval between transmission of an impulse and the reception of a corresponding echo pulse produced by said particular obstacle, and means to adjust the repetition frequency of impulse transmission proportional to the time interval determined for said particular obstacle.

6. A method of detecting the presence of obstacles such as airplanes and ships for simultaneously signaling the distance thereof, comprising transmitting a train of impulses, detecting and indicating echo pulses caused by the presence of obstacles in response to said train of impulses, selecting an echo pulse corresponding to a particular obstacle, determining the distance to said particular obstacle by measuring the elapsed time between transmission of an impulse and reception of the corresponding echo pulse from said particular obstacle, and signaling the distance of said selected obstacle by varying the pulse repetition frequency of subsequent transmission of impulses in proportion to the distance of said particular obstacle.

7. A combination radio detection and signaling system comprising means for transmitting recurring impulses, means to detect and indicate echo pulses caused by the presence of obstacles, means to select an echo pulse corresponding to a particular obstacle, means to measure the elapsed time between transmission of an impulse and reception of the corresponding echo pulse from said particular obstacle, and means to thereafter signal the distance of said particular obstacle by causing the transmitting means to operate at an impulse producing rate proportional to said elapsed time.

8. The system defined in claim 5 wherein the transmitter means comprises a radio frequency oscillator and a modulator to control the timing of impulse transmission by said oscillator, and the means for varying the frequency of impulse transmission is ganged for simultaneous adjustment with the said means to delay said impulses.

LOUIS A. DE ROSA.

REFERENCES CITED

The following references are of record in the file of this patent:

UNITED STATES PATENTS

| Number | Name | Date |
|---|---|---|
| 1,979,225 | Hart | Oct. 30, 1934 |
| 1,945,952 | Nicolson | Feb. 6, 1934 |